Jan. 2, 1951 K. S. VAN DYKE 2,536,111
DEW POINT HYGROMETER
Filed July 4, 1945 2 Sheets-Sheet 1
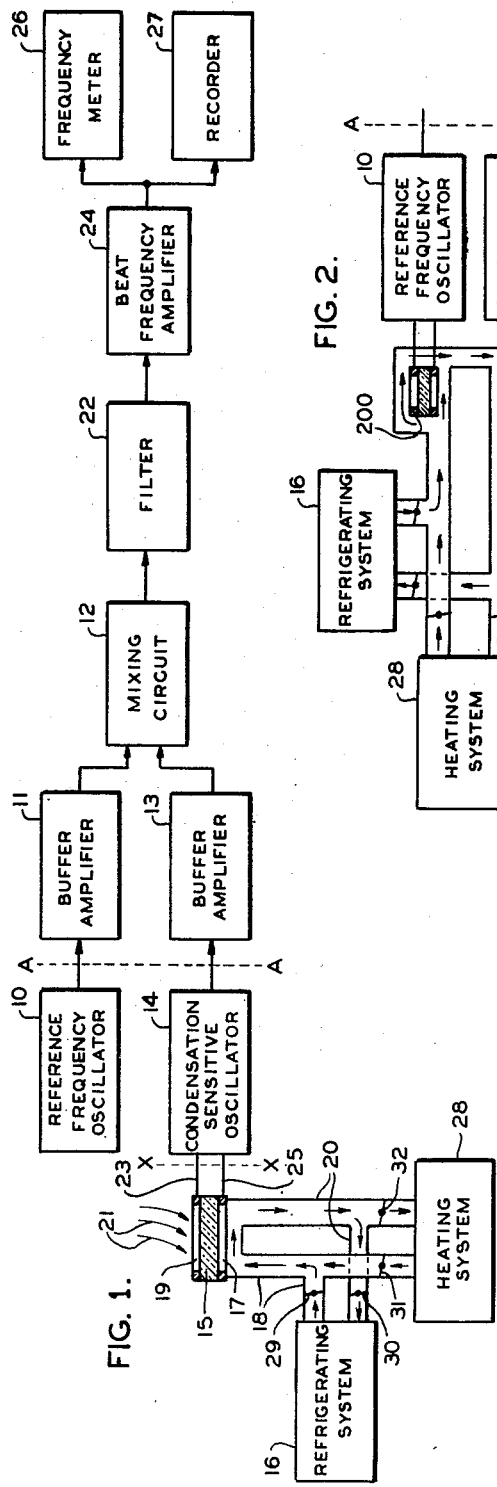
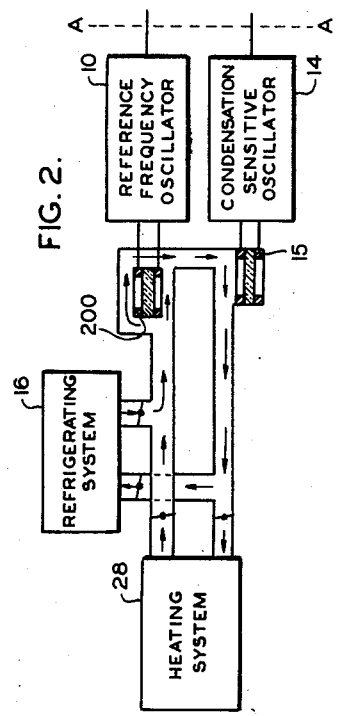
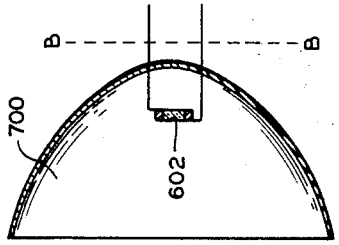
FIG. 7.
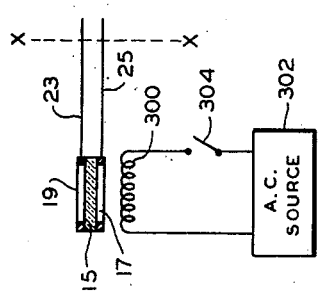
FIG. 3.
INVENTOR.
KARL S. VAN DYKE
BY
William D. Hall.
ATTORNEY

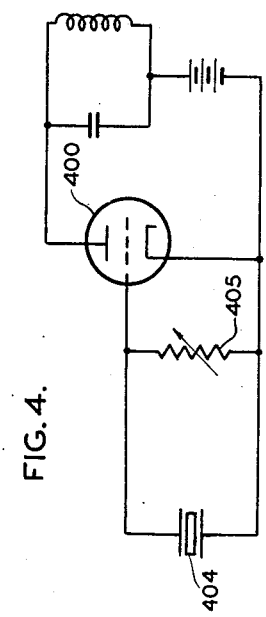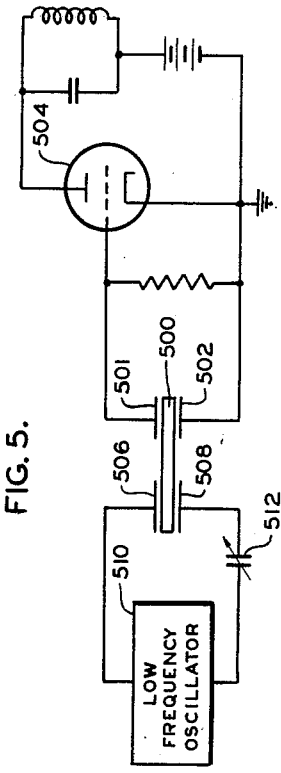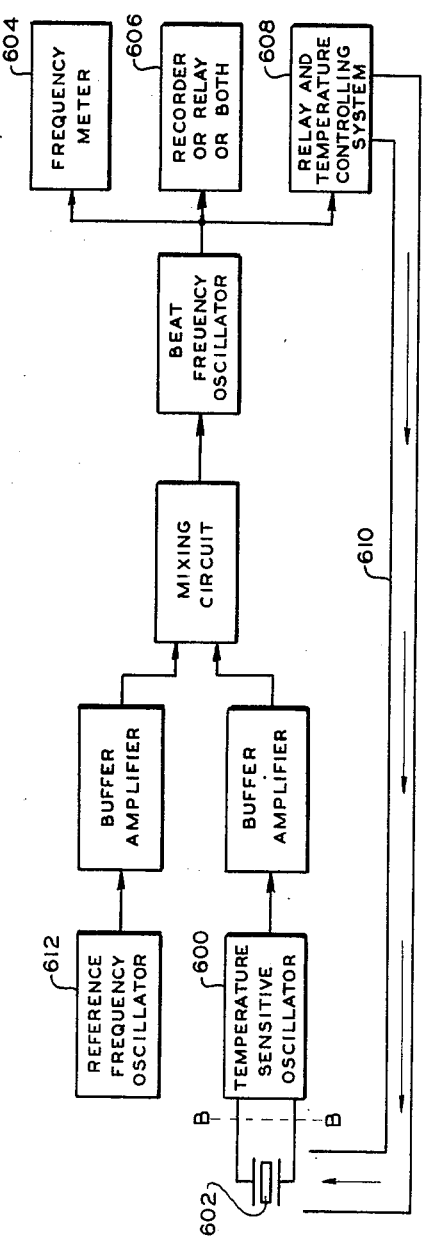

Patented Jan. 2, 1951

2,536,111

UNITED STATES PATENT OFFICE 2,536,111

DEW POINT HYGROMETER

Karl S. Van Dyke, Middletown, Conn.

Application July 4, 1945, Serial No. 603,241

19 Claims. (Cl. 73—17)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to apparatus and methods for measuring quantities of vaporized substances in any gas, for controlling temperatures, measuring temperatures, and for detecting the presence of heat energy.

The invention will be described in connection with several specific embodiments which include, by way of illustration of the invention, a dew-point hygrometer, a temperature measuring system, a temperature controlling system, and a radiation detecting system.

It is therefore an object of this invention to provide new methods and apparatus for measuring or indicating the presence of any condensable substance in vapor form, the apparatus thus acting, for example, as a dew-point hygrometer when used as an instrument for measuring atmospheric moisture.

Yet another object of this invention is to provide new methods and apparatus for measuring temperatures.

It is an additional object of this invention to provide new methods and apparatus for controlling temperatures.

Still another object of this invention is to provide new methods and apparatus for detecting the presence of heat energy, such as infrared radiation, or, radiation which embraces portions of the visible and invisible light spectrum.

These and other features of the invention will be more clearly understood from the following detailed description and the accompanying drawings in which:

Figure 1 is a block diagram of an apparatus for measuring or indicating the presence of a condensable substance in vapor form, Figures 2 through 5 are modifications of a cooling and heating cycle used in connection with the resonance-controlling element, Figure 6 is a block diagram of a temperature indicator, or temperature-controlled system, Figure 7 is a modified version of Fig. 6 in which the resonance-controlling element is used as a radiation-sensitive device.

While the apparatus disclosed in Fig. 1 may be used as a means for detecting or measuring the amount of any condensable ambient vapor, or for detecting or differentiating between various distillates, it will be illustrated first, by way of an example, in connection with measuring moisture in atmosphere, or as a dew-point hygrometer, and other uses of the apparatus will be pointed out in the latter part of this specification.

In the prior art, a common form of dew-point hygrometer consisted of a source of light, a cooled mirror or plate provided with a light-reflecting surface which intercepts and reflects the incident light, and a photo-electric cell for intercepting the reflected light, the latter in many instances being replaced by the eye of the observer. The photo-electric cell is connected to an amplifier and the output of the amplifier is connected to a current measuring device which indicates the formation of condensate on the surface of the mirror through a lower reading on the meter at the instant of the formation of condensed moisture on the reflecting surface. Devices of this type are sensitive to approximately $\pm 1°$ C. According to another method, which also includes the source of light, the cooled light-reflecting plate, the photo-electric cell, the photo-electric cell amplifier and the meter, an induction heater is used for periodic heating of the plate to a temperature which is on the threshold of preventing the formation of the condensate, and the amount of atmospheric moisture is measured by means of the energy necessary to supply to the induction heater for preventing the formation of the condensate. Devices of this kind are capable of indicating the dew-point temperature, which is then used for determining the amount of atmospheric moisture, within $\pm 2°$ C. An additional device for measuring the temperature of the dew-point consists of a cup filled with ether or alcohol, the outer wall of the cup being provided with a highly polished surface. This polished surface is cooled by the evaporation of ether or alcohol to the point at which there is a condensation of moisture on the outer polished surface, and the temperature at which the condensate is formed is determined by measuring the temperature of the used cooling agent, i. e., the temperature of the ether or alcohol. The apparatus of the latter type is reliable to approximately $\pm 5°$ C.

The invention utilizes a known phenomenon that quartz crystal resonators are extremely sensitive to any loading that may be placed on the exposed surface of the crystal, the sensitivity, for example, extending to a monomolecular layer of water deposited on the surface of the crystal, the layer stopping the oscillation of the crystal when a part of an oscillator circuit, or altering its frequency of oscillation, its activity, or its resonating properties, or any or all of these. To obtain the formation of deposit on the condensing surface of the crystal, the opposite surface of the crystal is subjected to a, preferably, alternating cycle of cooling and heating, the cooling cycle continuing until the dew-point is reached and until there is an incidence of condensate on the exposed condensing surface of the crystal. Upon the formation of the condensate, the cooling cycle is replaced by the heating cycle, and the latter is continued until the condensate present on the condensing surface is evaporated. The piezo-electric crystal is connected to a vacuum tube oscillator, the crystal controlling the frequency of the oscillator. As the condensing surface of the crystal becomes loaded during the cooling cycle, the frequency, or activity of the crystal, or both, change, producing a corresponding frequency change of oscillation or a diminution or cessation of the oscillations. These changes serve to indicate the incidence of condensation during the cooling cycle of the crystal. Corresponding indications in reversed sense may be obtained by reversing the process, i. e., with the crystal being heated until the last trace of a condensate, previously formed, disappears from the condensing surface during a warming process. By choice of the cut of quartz, the mode of vibration, and of the frequency of the condensation-indicating quartz element, the change in frequency with surface-loading may be made as sensitive as desired. Alternatively, by choice of the stability in the oscillator circuit, of which the condensation-indicating crystal is a part, the indications of deposit are made as critical as desired. Thus by proper choice of these factors a mono-molecular layer of condensate will be just enough to cause cessation of oscillations. During these alternate cooling and heating cycles, the frequency of the oscillator is continuously measured and it is this frequency that is used for indicating the temperature of the condensing surface, the dew-point temperature being indicated by the frequency just prior to cessation of the oscillations from the previously established frequency-temperature calibration curve of the oscillator. Accurate determinations of the dew-point are possible by using a crystal-cut whose frequency varies rapidly with the temperature. The frequency at the instant of the appearance of the condensation on the surface of the indicating crystal, and thus the dew-point temperature, is obtained by heterodyning means. A reference crystal of low, zero, or of any known temperature coefficient of frequency oscillating at a frequency near to that of the sensitive crystal provides in its heterodyne frequency, a micrometer scale capable of indicating small percentage changes in frequency of the indicating crystal. These frequency changes are converted in the heterodyne circuit into changes of a low frequency which are of larger percentages and thus provide a sensitive temperature scale for the fine resolution of temperature to a small fraction of a degree. The reference crystal is connected to a second crystal-controlled oscillator and it is the output of the latter that is used for heterodyning the frequency of the condensation-sensitive oscillator. The reference frequency crystal is placed in a temperature controlled mounting so that the frequency of the reference oscillator remains constant. According to another embodiment of the invention the reference crystal is mounted near to the condensation-indicating crystal so that it experiences the same atmospheric and temperature variations as the condensation-indicating crystal but it is shielded from the influence of the air stream whose dew-point is being studied so that there is no condensation appearing on the surface.

The invention also discloses a system for measuring temperatures.

In the prior art the most sensitive temperature measuring devices involve the use of thermocouples connected to sensitive Wheatstone bridges with a sensitive galvanometer connected across the Wheatstone bridge. Temperature measuring apparatus of this kind is capable of detecting temperature changes in the order of .001° C. so long as very sensitive galvanometers and long focus optical systems are used. The galvanometers and the optical systems of this type require special suspensions which must prevent even the slightest vibration from reaching them. As a consequence the apparatus is not suitable for use in an environment where the vibration is so pronounced that the use of the galvanometer, together with its optical system, is impracticable.

The invention discloses a temperature-controlling system or a temperature measuring system which is capable of detecting temperature changes of at least the order of 0.01° C. and which may be used under more adverse conditions than the known thermocouple—Wheatstone bridge—galvanometer combination. According to the invention, the temperature changes are followed by a piezo-electric crystal which controls the frequency of a crystal-controlled oscillator. The frequency of this oscillator is compared with the frequency of a second reference-frequency crystal-controlled oscillator in a mixing circuit, and the output of the latter is impressed on a frequency meter and a recorder, or a relay, or both, which respond to the beat frequency produced by the two crystal-controlled oscillators. The system is capable of producing a frequency change in the order of 100 cycles per 1° C., and as a consequence may be used for detecting temperature changes in the order of .01° C. with the known frequency measuring devices. Depending upon the instruments connected to the output of the system, it may act as a temperature indicator, a temperature recorder, or a temperature-controlling system.

When the temperature-sensitive crystal is placed at the focal point of a hyperbolic reflector, the above mentioned temperature measuring system may be used as a radiation indicating device.

Referring to Fig. 1, a reference-frequency crystal-controlled oscillator 10 impresses its frequency on a mixer circuit 12. Oscillator 10 is a crystal-controlled oscillator whose frequency is maintained constant by any known means as by maintaining the temperature of the crystal constant. Mixing circuit 12 is also connected to a condensation-sensitive oscillator 14 whose frequency is controlled by a condensation-sensitive crystal illustrated at 15. The lower side 17 of this crystal is subjected to an intermittent cooling by a refrigerating system 16, the refrigerant being circulated through tubes 18 and 20 around side 17 of the crystal. The upper side 19 of the crystal plate is exposed to a gas or atmosphere 21 containing any vapor or moisture and when crystal plate is exposed to a gas or atmosphere 21 containing any vapor or moisture and when crystal 15 reaches sufficiently low temperature because of the action of the refrigerant, there is a deposition of condensate on side 19 of the crystal with the concomitant lowering of its activity and change in its frequency. Condensation-sensitive oscillator 14 is connected to crystal 15 over conductors 23 and 25, the frequency of this oscillator being controlled by crystal 15. Formation of the condensate on side 19 may be made to proceed until oscillations of crystal 15 and oscillator 14 stop altogether. Depending upon the rapidity of successive moisture determination desired, the cooling cycle is stopped by closing valves 29 and 30 either slightly before the complete cessation of oscillations, or at the instant there is an appearance of a dip in the frequency of oscillator 14, and additionally, crystal 15 is allowed to come gradually up to a higher ambient temperature during the intervals between cooling stages, should the ambient temperature be sufficiently high for evaporating the condensate from surface 19. When this is not the case, or it is desirable to speed up the heating cycle, a heating system 28 may be used for raising the temperature of the crystal to a point at which the condensate disappears from surface 19, and there is a resumption of full scale oscillation by oscillator 14. This is at once indicated on a frequency meter 26, whereupon the heating cycle is stopped by closing valves 31 and 32 and the refrigerating cycle resumed by opening valves 29 and 30 for obtaining another measurement of atmospheric moisture. Thus successive moisture determinations follow each other indefinitely, the spacings between the adjacent determinations being controlled by the colorific inertia of crystal 15. The output of oscillator 14 is impressed on mixing circuit 12 where the two frequencies, generated by the oscillators 10 and 14, are combined so as to produce beat frequency.

The two crystal-controlled oscillators have their frequencies preferably adjusted so as to be equal at a temperature just outside of the duty cycle. For thickness vibrating crystals the sensitivity to loading obtained is greater the higher the frequency of the crystal used. Thus, in one embodiment of the invention the frequencies of the oscillators are equal to 5 megacycles per second. By making the oscillators high frequency oscillators, it is possible to obtain large frequency changes in oscillator 14 when it is subjected to the influence of the condensate. The condensation-sensitive crystal 15 has a maximum temperature coefficient of frequency and therefore will respond greatly to temperature changes. When crystal 15 is subjected to the influence of the heating and cooling cycles, its frequency will differ from the frequency of the reference frequency oscillator 10 with the result that two slightly different frequencies will be impressed on mixer 12. These are rectified by the mixer and are impressed as a modulated signal on a band-pass filter 22 which passes a beat frequency produced by the interaction of the two frequencies impressed on the mixer. The beat frequency is impressed on a beat frequency amplifier 24, and the output of the amplifier is impressed in a frequency meter 26 which is calibrated so as to indicate the temperature of the condensation-sensitive crystal. The scale of the frequency meter 26 is calibrated as a dew-point hygrometer so that its readings give directly atmospheric moisture content. The output of amplifier 24 is also connected to a recorder 27 which furnishes a continuous hygrometric record.

Fig. 2 discloses a modification of the cooling and heating arrangement for the crystals of the oscillators 10 and 14. In Fig. 1, oscillator 10 is a constant frequency oscillator, its frequency being maintained constant by a temperature-controlled crystal element. In Fig. 2 both crystals are subjected simultaneously to alternate heating and cooling, and crystals 15 and 200 have opposite temperature coefficients. The cooling and heating arrangement for crystal 15 in Fig. 2 is identical to that disclosed in Fig. 1. The modification resides in applying the cooling-heating cycle of crystal 15 to a crystal 200 so that the latter follows the temperature changes of crystal 15. Since the crystals have frequency temperature coefficients of opposite signs, greater frequency change per degree change in temperature will be impressed on amplifier 24, and therefore the system disclosed in Fig. 2 will be more sensitive than the one disclosed in Fig. 1. The remaining connections in the Figs. 1 and 2 are identical, as illustrated by a dotted matching line A—A. It is to be noted that in Fig. 2 only crystal 15 is subjected to a condensate loading, Figs. 1 and 2 being identical in this respect. The sensitivity of the system disclosed in Figs. 1 and 2 may be increased still further by counting actual beats appearing in the output of amplifier 24 rather than listening to or measuring the frequency of a beat note with a frequency meter. Moreover, loading effects in the frequencies of the two crystals due to varying atmospheric pressure are compensated by selecting crystals having equivalent frequency-ambient pressure characteristics.

Fig. 3 discloses an alternative method of heating crystal 15. A coil 300 is mounted in proximity of the lower surface 17 of the crystal, the coil being connected to an A. C. source 302 through a switch 304. When switch 304 is closed, there is an induction heating of the crystal which is continued until condensate on the upper surface 19 is evaporated. The functioning of the system is otherwise identical to that of Fig. 1, line X—X being a matching line between Figs. 1 and 3.

Fig. 4 illustrates an additional alternative method for heating crystal 15. A crystal-controlled oscillator 400 corresponding to oscillator 14 in Fig. 1, is provided with a variable resistor 405 shunting a crystal 404, the latter corresponding to crystal 15 in Fig. 1. By varying the setting of resistor 405, it is possible to obtain intermittent heating of the body of the crystal by increasing the amplitude of vibration of crystal 404 by increasing the resistance of the resistor 405. Alternatively, the crystal is allowed to cool off when its vibrations are decreased by decreasing the resistance of resistor 405. Thus in Fig. 4, intermittent heating and cooling of the crystal is obtained by increasing and decreasing the amplitudes of its vibration at the resonance frequency of the oscillator. The condensation is obtained on either of the two surfaces of the crystal, or both surfaces of the crystal during the low amplitude vibrations of the crystal.

Fig. 5 illustrates still another method of obtaining periodic heating of the crystal. Crystal 500 is connected by means of electrodes 501 and 502 to an oscillator 504, the latter corresponding to oscillator 14 in Fig. 1. Electrodes 506 and 508 also coupled to crystal 500, are connected to a low frequency oscillator 510 which acts as a source of crystal-heating oscillations. Low frequency oscillator 510 subjects crystal 500 to intense vibration for heating purposes on resonance mode which has relatively small supersonic effects in the ambient from which the condensation is to take place and which has relatively small surface agitation of the condensation-sensitive surface or surfaces of the crystal. The vibration produced in crystal 500 by oscillator 510 must be relatively coupling-free from the low amplitude resonance which is to serve as condensation-indicator. By varying the setting of a coupling condenser 512, the heating system illustrated in Fig. 5 may be arranged to function as a substantially continuous condensation-indicating phenomenon, the heating-cooling cycle of vibrator 500 oscillating by slightly above and below equilibrium conditions. Thus the system disclosed in Fig. 5 functions as a substantially continuously indicating hygrometer.

Fig. 6 discloses a temperature-indicating, or temperature-controlling system in which the frequency variations produced in a temperature-sensitive oscillator 600 connected to the crystal 602 are utilized for obtaining temperature indications on a meter 604, or recorder 606. When the system functions as a temperature-indicating system, or for controlling the temperature of ambient air surrounding crystal 602 wherein recorder 606 is substituted by a relay and temperature-controlling system 608, the output of the latter being used for controlling the temperature of the ambient air through a duct 610. The ambient temperature of the air surrounding crystal 602 by any known means, such as radiating or refrigerating systems which are illustrated diagrammatically as duct 610. Examination of Fig. 6 discloses that the main elements are identical to those disclosed in Fig. 1, the difference residing only in the mode of mounting crystal 602. While in Fig. 1, crystal 15 is subjected to a continuous alternating heating and cooling cycle and periodic deposits of condensate on its upper surface 19, in Fig. 6 the temperature-sensitive crystal 602 is mounted so as to respond to the temperature of ambient air and since it is used either for measuring or controlling the temperature of the ambient air the heating-refrigerating cycle and periodic deposition of condensate is dispensed with and the crystal acts solely as a temperature-sensitive device. As in the case of Fig. 1, the reference-frequency oscillator 612 may be either a constant-frequency oscillator whose frequency is controlled by an AT-cut crystal having a substantially zero frequency-temperature coefficient requiring no thermal control or it may be a thermally controlled crystal oscillator, or when the system must respond to very minute temperature changes. Moreover the crystal cuts for crystal 602 and the crystal used for controlling the reference oscillator 612 may be selected so as to have frequency-temperature coefficients of opposite signs in which case the temperatures of the two crystals depend upon the ambient temperature of the air and meter 604, recorder 606, or relay and temperature-controlling system 608, respond to any frequency change which takes place when there is a change in ambient temperature.

Fig. 7 discloses a modification of Fig. 6, the modification residing in the fact that the temperature-sensitive crystal 602 has been placed at the focal point of a parabolic reflector 700 so that it acts as a radiation intercepting device, the parabolic reflector accentuating the temperature changes produced in crystal 602 by the intercepted radiation. When the radiation-sensitive crystal is used in connection with a parabolic reflector 700, the temperature-sensitive oscillator 600, which is now a radiation-sensitive oscillator, should be of that type which has low impedance looking into the oscillator from the crystal. This is desirable because of the fact that the leads interconnecting crystal 602 with the oscillator may be somewhat longer in Fig. 7 rather than in any other figures and as a consequence it is preferable to use the radiation-intercepting crystal as a low impedance device. The radiation-intercepting surfaces of crystal 602, or more specifically, the electro-plated metallic surfaces deposited on the electrode surfaces of the crystal, may be coated with very thin coatings of any known radiation-absorbing substance for increasing the absorption of radiation by the crystal. Care must be taken that such substance has sufficient physical stability and adhesive properties to avoid any parasitic frequency changes in the crystal.

In describing the functioning of Figs. 1 through 7, it has been stated that the devices giving the final indications of the observed phenomenon are frequency-responsive devices. In my co-pending application on Resonance-controlled Apparatus, Serial Number 603,242, filed July 4, 1945, systems and methods are disclosed for obtaining the same type of measurements, indications, and controls, in which frequency-responsive devices are replaced with amplitude-responsive devices.

In conclusion it should be mentioned that temperature-frequency characteristic of the condensation- or temperature- or radiation-sensitive crystal should be selected so as to be a continuous function over the range under observation. This is desirable for obtaining a continuous scale on the indicating meters which is obviously possible only when the temperature-frequency characteristic curve of the crystal is a continuous function.

While the invention has been disclosed in this application in connection with the heterodyne-sensitive system and in the above mentioned co-pending application in connection with amplitude-sensitive systems, it is to be understood that changes in oscillation frequency and changes in amplitude of oscillation are indications of changes in the resonating properties of the condensation- or temperature- or radiation-sensitive resonating element and that any means of indicating these changes in response to changes of the ambient may be used. Thus in the co-pending application the resonating element is a piezo-electric crystal in a filter circuit where it controls, limits, or varies the transmission of the oscillation through the crystal to an indicating device. Moreover, while piezo-electric quartz crystals represent very sensitive resonating elements, less sensitive devices, such as magneto-strictive rods, may be used for accomplishing the sought results, although the sensitivity of the latter is of course not as good as that of the quartz crystals, or other piezo-electric elements.

While the invention has been described with reference to several embodiments, it will be understood that various modifications of the apparatus shown may be made within the scope of the following claims.

I claim:

1. An apparatus for measuring and indicating the presence of any condensable substance in vapor form which includes, a reference-frequency oscillator, a condensation-sensitive oscillator, a piezo-electric element, instrumentalities for alternately cooling and heating said piezo-electric element on one side, the other side of said piezo-electric element being exposed to said vapor, connections between said piezo-electric element and said condensation-sensitive oscillator, said piezo-electric element controlling the frequency of said condensation-sensitive oscillator so as to change the frequency thereof during the cooling cycle, to change the frequency thereof in the opposite sense during the heating cycle, and to stop the oscillations of said condensation-sensitive oscillator upon the formation of the condensate of said vapor on one of the surfaces of said element, and instrumentalities connected to said reference-frequency oscillator and to said condensation-sensitive oscillator for indicating the formation of said condensate on said element.

2. An apparatus for measuring and indicating the presence of any condensable substance in vapor form which includes, a reference-frequency oscillator, a condensation-sensitive oscillator, a piezo-electric element, instrumentalities for alternately cooling and heating said piezo-electric element on one side, the other side of said piezo-electric element being exposed to said vapor, connections between said piezo-electric element and said condensation-sensitive oscillator, said piezo-electric element having a cut and a degree of coupling between said element and said condensation-sensitive oscillator so as to change the frequency of said condensation-sensitive oscillator during the cooling cycle, to change the frequency thereof in the opposite sense during the heating cycle, and to reduce the amplitude of oscillation thereof upon the formation of the condensate of said vapor on one of the surfaces of said element, and instrumentalities connected to said reference-frequency oscillator and to said condensation-sensitive oscillator for indicating the formation of said condensate on said element.

3. An apparatus as defined in claim 2 in which said instrumentalities include, a mixing circuit, a filter, a beat frequency amplifier, and a frequency-responsive device connected to said amplifier.

4. An apparatus as defined in claim 2 in which said instrumentalities include, a mixing circuit, a filter, and an amplitude-responsive device connected to said filter, said amplitude-responsive device indicating the frequency difference between said oscillators.

5. An apparatus as defined in claim 2 in which said instrumentalities include, a mixing circuit, a filter, an amplifier, and a recorder, said recorder furnishing a temperature-vs.-formation of condensate record.

6. An apparatus as defined in claim 2 in which said instrumentalities for alternately heating and cooling said piezo-electric element comprises said condensation-sensitive oscillator and means for increasing and decreasing the degree of coupling between said condensation-sensitive oscillator and said element.

7. An apparatus as defined in claim 2 in which said heating instrumentalities include, an oscillator coupled to said element, said oscillator subjecting said element to intense vibration for heating purposes on a resonance mode having smaller supersonic effects in the ambient from which the condensation is to take place, and relatively small surface agitation of the condensation-sensitive surface of said element, and means for varying the amplitude of said vibration.

8. An apparatus as defined in claim 2 in which said heating instrumentalities include, an oscillator coupled to said element, said oscillator subjecting said element to intense vibration for heating purposes on a resonance mode which has smaller amplitudes of the condensation-sensitive surface of the element in relation to the internal heating of the crystal caused by this mode of vibration than in the condensation-sensitive mode.

9. An apparatus as defined in claim 2 in which said heating instrumentalities include an A. C. source, a coil connected to said source and placed in the vicinity of said element whereby said coil produces an induction heating of said element, and means for connecting and disconnecting said source from said coil.

10. An apparatus for measuring and indicating the presence of any condensable substance in vapor form which includes a reference-frequency oscillator, a condensation-sensitive oscillator, a temperature-sensitive vibrating element connected to and controlling the frequency of said reference-frequency oscillator, and a second temperature-sensitive vibrating element connected to and controlling the frequency of said condensation-sensitive oscillator, said second element having a surface exposed to said substance and having its amplitude of vibration damped by the formation of a condensate on said exposed surface, said first and second elements having temperature-frequency-coefficients differing in sign from each other.

11. An apparatus as defined in claim 10 which also includes, a refrigerating system, a heating system, and instrumentalities for alternately connecting said refrigerating and heating systems to said vibrating elements.

12. An apparatus as defined in claim 10 which also includes a refrigerating and a heating system, and instrumentalities for alternately connecting said refrigerating and heating systems to said first vibrating element and one surface of said second element.

13. An apparatus for indicating the formation of a condensate in an atmosphere containing a condensable substance in vapor form, including a piezoelectric element having at least one surface exposed to said atmosphere the vibration of said piezoelectric element being damped by the formation of a condensate on said exposed surface, a source of energy connected to said element for causing said element to vibrate at its natural frequency, and means for measuring the amplitude of said vibrations, whereby an abrupt change in the amplitude of said vibration is an indication of the formation of a condensate on said exposed surface.

14. An apparatus as defined in claim 13 wherein the natural frequency of said piezoelectric element is a function of temperature and further including frequency measuring means connected to said element, whereby the temperature of said piezoelectric element is determined.

15. An apparatus as defined in claim 14 further including instrumentalities for alternately cooling said piezoelectric element until a condensate is formed and heating said piezoelectric element until the condensate is evaporated, whereby the dew point is determined by measuring the frequency and consequently determining the temperature at which the formation of a condensate takes place.

16. A method for measuring and indicating the dew point of any condensable substance in vapor form including the steps of generating an alternating current voltage, lowering the temperature of said substance, varying the frequency of said voltage as a function of temperature, forming a condensate, changing said voltage abruptly on the formation of the condensate, and continuously indicating the frequency of said voltage whereby the frequency of said voltage immediately preceding said abrupt change is a measure of the dew point.

17. A dew-point hygrometer including a condensation-sensitive oscillator, said condensation-sensitive oscillator having a piezoelectric element, said element having at least one surface exposed to an ambient atmosphere, said oscillator having its output changed abruptly by the formation of a condensate on said exposed surface, and instrumentalities connected to said condensation-sensitive oscillator for indicating the change in output of said oscillator when a condensate is formed on said piezoelectric element.

18. A dew-point hygrometer as defined in claim 17 wherein a surface of said piezoelectric element is enclosed from said atmosphere, and further including instrumentalities for alternately cooling and heating said enclosed surface.

19. A dew-point hygrometer as defined in claim 17 wherein said piezoelectric element is frequency-sensitive to temperature and further including instrumentalities connected to said oscillator for indicating the frequency and thus the temperature at which the formation of a condensate on said exposed surface takes place.

KARL S. VAN DYKE.

REFERENCES CITED

The following references are of record in the file of this patent:

UNITED STATES PATENTS

| Number | Name | Date |
| --- | --- | --- |
| 1,951,276 | Edwards et al. | Mar. 13, 1934 |
| 2,011,710 | Davis, Jr. | Aug. 20, 1935 |
| 2,240,082 | Thornthwaite | Apr. 29, 1941 |
| 2,268,785 | Thornthwaite | Jan. 6, 1942 |
| 2,375,273 | Black | May 8, 1945 |
| 2,376,209 | Turin | May 15, 1945 |

FOREIGN PATENTS

| Number | Country | Date |
| --- | --- | --- |
| 545,832 | Great Britain | June 15, 1942 |